United States Patent
Simons

(10) Patent No.: US 6,455,157 B1
(45) Date of Patent: Sep. 24, 2002

(54) METHOD FOR PROTECTING AND MARKING PRODUCTS BY USING MICROPARTICLES

(75) Inventor: Rolf Simons, Nottuln (DE)

(73) Assignee: Simons Druck & Vertrieb GmbH (DE)

( * ) Notice: Subject to any disclaimer, the term of this patent is extended or adjusted under 35 U.S.C. 154(b) by 0 days.

(21) Appl. No.: 09/443,747

(22) Filed: Nov. 19, 1999

(30) Foreign Application Priority Data

Nov. 21, 1998 (DE) ......................... 198 53 764

(51) Int. Cl.⁷ ............... B05D 5/00; B32B 5/02; B32B 33/00; B41M 3/14
(52) U.S. Cl. .............. 428/402; 428/403; 428/411.1; 106/31.65; 252/965; 427/7; 427/8; 427/180; 427/197; 427/201; 427/202; 427/203
(58) Field of Search ............... 283/81, 91, 92; 252/965; 106/31.65; 428/402, 403, 411.1; 427/7, 8, 180, 197, 201, 202, 203, 204, 205, 206; 149/173

(56) References Cited

U.S. PATENT DOCUMENTS

| | | | |
|---|---|---|---|
| 4,053,433 A | 10/1977 | Lee ................... | 252/408.1 |
| 4,131,064 A | 12/1978 | Ryan et al. ............ | 102/1 R |
| 4,390,452 A | 6/1983 | Stevens ............... | 252/408.1 |
| 4,606,927 A | 8/1986 | Jones ................. | 427/7 |
| 4,640,035 A | 2/1987 | Kind et al. ............ | 40/625 |
| 5,118,369 A | 6/1992 | Shamir ................ | 156/64 |
| 5,637,169 A | 6/1997 | Hull et al. ............. | 156/155 |

FOREIGN PATENT DOCUMENTS

| | | | |
|---|---|---|---|
| CA | 1056653 | * | 6/1979 |
| DE | 2607014 | | 10/1976 |
| DE | 2651528 | | 5/1977 |

* cited by examiner

*Primary Examiner*—Paul Thibodeau
*Assistant Examiner*—Ramsey Zacharia
(74) *Attorney, Agent, or Firm*—Sonnenschein Nath & Rosenthal

(57) ABSTRACT

The invention relates to a method for protecting and marking products by using microparticles, which are to be attached or added to the product, each microparticle having several color layers forming a code, wherein for each individual product two or more differently coded microparticle groups are used, with the first microparticle group containing in its code the same information for a plurality of products, and with the second or subsequent microparticle group containing in its code an information which is individual for each individual product or for few products. The method provides that the second microparticle group is formed by microparticles describing the unit place and the tens place of a decimal number; an optionally provided third microparticle group is formed by microparticles describing the hundreds place and the thousands place of a decimal number; an optionally provided fourth microparticle group is formed by microparticles describing the ten thousands place and the hundred thousands place of a decimal number; and the microparticles of each microparticle group have at least one own and distinct group marking color layer.

20 Claims, No Drawings

METHOD FOR PROTECTING AND MARKING PRODUCTS BY USING MICROPARTICLES

BACKGROUND OF THE INVENTION

The present invention relates to a method for protecting and marking products by using microparticles, which are to be attached or added to the product, each microparticle having several color layers forming a code, wherein for each individual product two or more differently coded microparticle groups are used, with the first microparticle group containing in its code the same information for a plurality of products, and with the second or subsequent microparticle group containing in its code an information which is individual for each individual product or for few products. Furthermore, the invention relates to a variation of the method to form a pure numbering method.

A method of the kind mentioned first is known from U.S. Pat. No. 4,390,452. It is described in this document that a substance or an object, which generally means a product, can be provided with two or more: differently coded microparticle groups, e.g., a first microparticle group describing the manufacturer, and a second microparticle group describing individual production units. As a first example, automobile varnish is cited which may be characterized by a first microparticle group describing the varnish plant, and with a second microparticle group describing the day or the week of the varnish production. As a second example, animals are cited which may be marked regarding the owner with one group, and regarding a biological treatment with the other group, wherein the markings may also be applied at different points in time. As it is particularly obvious from the example of the automobile varnish, the number of the production units to be differentiated is relatively small, in this case, e.g., 365 for the number of the days or 53 for the number of the weeks of one year. On the other hand, for each day to be marked or for each week to be marked, an individual microparticle code has to be used. Thus, the number of the differently coded microparticles corresponds directly to the number of the days to be marked or weeks to be marked or to other units to be marked. Such a method is tolerable with relatively small numbers, however, when the numbers reach a higher order, such a method is absolutely inefficient. This inefficiency is in particular caused by the fact that often very great numbers of products are produced in a product series, and that if for each product an own individual marking is required, for each of these markings only a very small amount of microparticles is required. The production of a very great number of differently coded microparticles in very small amounts of each code is very costly for the producer of microparticles, and not economical. For the user of the microparticles such a method requires a very high effort in logistics for storing, for associating and for attaching or adding of the correct microparticles to each associated piece of product.

SUMMARY OF THE INVENTION

It is an object of the present invention to provide a method of the kind mentioned above which avoids the drawbacks mentioned, and which is able to protect and mark individual products, even in case of great product numbers, with a reasonable economical and logistic effort. Furthermore, the method shall be able to be varied such that it can be used for a pure numbering of products whenever an overall marking, e.g., with a manufacturing code, is not required or desired.

For attaining the first part of the object a method of the kind mentioned before is proposed which is characterized in that the second microparticle group is formed by microparticles describing the unit place and the tens place of a decimal number, that an optionally provided third microparticle group is formed by microparticles describing the hundreds place and the thousands place of a decimal number, that an optionally provided fourth microparticle group is formed by microparticles describing the ten thousands place and the hundred thousands place of a decimal number, and that the microparticles of each microparticle group have at least one own group marking color layer.

DETAILED DESCRIPTION OF THE PREFERRED EMBODIMENTS

With the method according to the invention it is advantageously attained that beside an overlapping information, which is the same for a plurality of products, each individual product may be provided with an individual information, without the effort therefore becoming uneconomically large. By the feature that two decimal places are described in one microparticle group, a relatively small and therefore economical number of differently coded microparticle groups will result, wherein this advantage becomes more and more positive with an increasing multi-place decimal number. With the second microparticle group as mentioned before, all decimal numbers between 0 and 99 may be described; with the third microparticle group, additionally the hundreds and thousands place of decimal numbers between 100 and 9999 may be described, such that when using the second and the third microparticle group with 200 differently coded microparticle between them, all numbers between 0 and 9999 may be described. If required, this method may be enlarged upwards in case even larger numbers have to be described. Each additional microparticle group therein enlarges the range of numbers to be described by the factor 100, whereas the number of the differently coded microparticles will increase only by 100. In order to enable the user to differentiate the microparticle groups from each other, each microparticle group has at least one own group marking color layer, that is, a color layer designating the group which is a different color from that used by other groups. Because of this group marking color layer, the microparticles may be differentiated and may be easily sorted into the numbering system to be described, such that a later decoding of the code is possible without any problems. Therefore, the products may be marked as well as, e.g., regarding the producer and also regarding a series number, wherein the number of the differently coded microparticle groups required therefore remains in a range which is reasonable and can be handled without any problems.

Furthermore, it is preferably provided that for the second and possibly third and possibly fourth microparticle group, microparticles with four layers are used, which beside the group marking color layer have two numeral color layers, and a separating color layer between the two numeral color layers, wherein the color of each numeral color layer is selected out of ten different colors corresponding to the decimal numerals 0 to 9. By the limitation of the number of the color layers to four layers, the production of these microparticles is possible with a relatively small effort. Furthermore, there is the possibility to produce the microparticles of the first microparticle group with a different color layer number and to differentiate them thereby without any doubt from the microparticles of the second and possibly further microparticle group(s).

A further simplification of the production and of the identification and decoding of the microparticles is gained by the feature that the group marking color layer and the separating color layer comprise the same color within each microparticle group.

For setting the sequence in which the color layers of the microparticle groups have to be decoded, it is preferably provided that the group marking color layer is arranged as the outer layer at the outside of the numeral color layer describing the higher decimal place.

If the method has to be used in cases in which, e.g., the user produces extraordinary large numbers of one product and wants to mark them, or in which the user wants to provide his products with number ranges which encompass more than six decimal places, the method may comprise a fifth microparticle group formed by microparticles with a number of layers required for the description of the additional decimal place(s) of decimal numbers exceeding the number 1,000,000, wherein these microparticles comprise at least one own group marking color layer, and wherein the number of their layers is preferably between two and six.

In a further embodiment of the invention, the fifth microparticle group besides or instead of the description of one or several decimal places, may contain an additional product related coded information.

In order to simplify the decoding of the different microparticles and to exclude errors in the decoding process, it is preferably provided that the numeral color layers are formed by full-tone colors, and the marking and/or separating color layers are formed by pastel and/or metallic and/or fluorescent colors.

A further simplification of the decoding of the microparticles may be attained in that the colors of the numeral color layers correspond to the colors of the international standardized color code for electrical resistors.

For attaining the second part of the object, it is proposed to use a variation of the method of the kind described before which is characterized in that it does not use the first microparticle group with the same information for a plurality of products, and that it is used as a pure numbering method for a numbering, preferably a continuous numbering, of the individual products of a product series. By this variation of the method it is possible to number the individual products of a product series individually, with a continuous numbering, or any other kind of numbering being possible without any problems.

The invention offers an inexpensive possibility to provide products with a producer code and/or with an individual number, which is/are not visible for the human eye because of the very small, microscopic size of the microparticles. By this it can, if necessary, be determined later without any problems, whether a product with a visible series number, e.g., a motor car, still carries the visible original number provided by the producer, or whether a falsification has been made by removing the original visible number and attaching a new visible number. This high security against falsification is attained, because the serial number attached or added to the product with the microparticles used according to the method of the present invention may not be removed by the forger and replaced by a new number. The microparticles are very unobtrusive and are invisible to the eye and they can be attached to any place of the product, with the place being known only to the producer and to persons who have controlling functions, e.g., police or customs.

A further advantage of the method according to the invention is that for applications, wherein no numbering is required, but only a coding or marking of the producer by way of microparticles is desired, the producer identification may be realized by a combination of two microparticle groups. For marking different producers an identical first microparticle group may be used, in combination with which different second or further microparticle groups are to be used. In doing so, care must only be taken that the same combination of the first microparticle group with the second or a further microparticle group is not used twice. For such a producer marking of products, standard prefabricated and stored microparticles may be used, such that for each producer wanting to use the method, no individual microparticles have to be produced and carried in stock. This means an essential increase of the economy of the method whereby it is also useable for applications which could not carry the costs hitherto.

After all it has to be stated that the method according to the invention in its embodiments and variations is very economical, because on the one hand, for the producer of microparticles it is not necessary to produce very small numbers of microparticles of a certain code, and because on the other hand, the user of the method has to carry in stock, associate and attach or add to the product. only a relatively small number of different microparticles.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for protecting and marking products by using microparticles, which aye to be attached or added to the product, each microparticle having several color layers forming a code, wherein for each individual product two or more differently coded microparticle groups are used, with the first microparticle group containing in its code the same information for plurality of products, and with the second or subsequent microparticle group containing in its code an information which is individual for each individual product or for few products, wherein the second microparticle group is formed by microparticles describing the unit place and the tens place of a decimal number;

an optionally provided third microparticle group is formed by microparticles describing the hundreds place and the thousands place of a decimal number;

an optionally provided fourth microparticle group is formed by microparticles describing the ten thousands place and the hundred thousands place of a decimal number wherein microparticles with four layers are used for the second and optionally third and optionally fourth microparticle group microparticles, which beside the group marking color have two numeral color layers and a separating color layer between The numeral color layers, wherein the color of each numeral color layer is selected out of ten different colors corresponding to the decimal numerals 0 to 9; and the microparticles of each microparticle group have at least one own group marking color layer.

2. A method according to claim 1, wherein for the group marking color layer and for the separating color layer the same color is used within each microparticle group.

3. A method according to claim 2, wherein the group marking color layer is arranged as the outer layer at the outside of the numeral color layer describing the higher decimal place.

4. A method according to claim 1, wherein it comprises a fifth microparticle group formed by microparticles with a number of layers required for the description of the additional decimal place(s) of decimal numbers exceeding the number 1,000,000, wherein these microparticles comprise at least one own group marking color layer, and wherein the number of their layers is between two and six.

5. A method according to claim 1, wherein it comprises a fifth microparticle group formed by microparticles with a number of layers required for an additional product related coded information, wherein these microparticles comprise at least one own group marking color layer, and wherein the number of their layers is between two and six.

6. A method according to claim 1, wherein the numeral color layers are formed by full-tone colors, and the marking and/or separating color layers are formed by pastel and/or metallic and/or fluorescent colors.

7. A method according to claim 6, wherein the colors of the numeral color layers are selected correspondingly to colors of an internationally standardized color code for electrical resistors.

8. A method according to claim 1, wherein it does not use the first microparticle group with the same coded information for a plurality of products, and that it is used as a pure numbering method for a numbering of the individual products of a product series.

9. A method for marking products by using microparticles, each microparticle having several color layers forming a code, wherein for each individual product, at least two differently coded microparticle groups are used, comprising the steps:
  forming a first microparticle; with a plurality of color layers, a first of said color layers comprising a first group color;
  forming a second microparticle group with a plurality of color layers, a first of sad color layers comprising a second group color, a layer comprising a color representing a units place of a decimal number and a layer comprising a color representing a tens place of a decimal number;
  providing a separating color layer between said numeral color layers; and
  applying a plurality of said first microparticle group particles and a plurality of said second microparticle group particles to said product.

10. A method according to claim 9, wherein said step of providing a separating color layer comprises providing a separating color layer of the same color as said group color.

11. A method according to claim 9, further comprising the steps of forming a third microparticle group with a plurality of color layers, a first of said color layers comprising a third group color, a layer comprising a color representing a hundreds place of a decimal number and a layer comprising a color representing a thousands place of a decimal number, and applying a plurality of said third microparticle group particles to said product.

12. A method according to claim 11, further comprising the steps of forming a fourth microparticle group with a plurality of color layers, a first of said color layers comprising a fourth group color, a layer comprising a color representing a ten thousands place of a decimal number and a layer comprising a color representing a hundred thousands place of a decimal number, and applying a plurality of said fourth microparticle group particles to said product.

13. A method according to claim 12, further comprising the steps of forming a fifth microparticle group with a plurality of color layers, a first of said color layers comprising a fifth group color, and at least one additional layer representing a further place magnitude, wherein said fifth microparticle group has between 2 and 6 layers.

14. A method according to claim 12, further comprising the steps of forming a fifth microparticle group with a plurality of color layers, a first of said color layers comprising a fifth group color, and at least one additional layer representing additional product related coded information.

15. A method according to claim 9, wherein said group color layer is provided as an outer layer of said particle adjacent said tens place layer.

16. A method according to claim 9, wherein said steps of forming said microparticle groups comprise selecting color layers from full-tone colors and selecting group colors from a group consisting of pastel, metallic and fluorescent colors.

17. A method according to claim 9, wherein said steps of forming said microparticle groups comprise selecting color layers to correspond to colors of an internationally standardized color code for electrical resistors.

18. A method for protecting and marking products by using microparticles, each microparticle having several color layers forming a code, wherein for each individual product, at least two differently coded microparticle groups are used, comprising the steps:
  forming a first microparticle group with a plurality of color layers, a first of said color layers comprising i first group color, a layer comprising a color representing a units place of a decimal number and a layer comprising, a color representing a tens place of a decimal number;
  forming a second microparticle with a plurality of color layers, a first of said color layers comprising a second group color, a layer comprising a color representing a hundreds place of a decimal number and a layer comprising a color representing a thousands place of a decimal number;
  providing a separating color layer between said numeral color layers; and
  applying a plurality of said first microparticle group particles and a plurality of said second microparticle group particles to said product.

19. A method for protecting and marking products by using microparticles, which are attached: or added to the product, each microparticle having several color layers forming a code, wherein for each individual product two or more differently coded microparticle groups are used, with the first microparticle group containing in its code the same information for a plurality of products, and with the second or subsequent microparticle group containing in its code an information which is individual for each individual product or for a few products, comprising:
  forming the second microparticle group by microparticles describing the ten place and the tens place of a decimal number;
  forming a optionally provided third microparticle group by microparticles describing the hundreds place and the thousands place of a decimal number;
  forming an optionally provided fourth microparticle group by microparticles describing the ten thousands place and the hundred thousands place of a decimal number wherein microparticles with four layers are used for the second and optionally third and optionally fourth microparticle group, which beside the group marking color layer have two numeral color layers and a separating color layer between the numeral color layers, wherein the color of each numeral color layer, is selected out of ten different colors corresponding to the decimal numerals 0 to 9; and the microparticles of each microparticle group have at least one own group marking color layer.

20. A method for marking products by using microparticles, each microparticle having several color layers forming a code, wherein for each individual product, at least two differently coded microparticle groups are used, comprising:

forming a first microparticle group with a plurality of color layers, a first of the color layers comprising a first group color;

forming a second microparticle group with a plurality of color layers, a first of the color layers comprising a second color group, a layer comprising a color representing a units place of a decimal number and a layer comprising a color representing a tens place of a decimal number;

positioning a separating color layer between the numeral color layers; and applying a plurality of the first microparticle group particles and a plurality of the second microparticle group particles to the product.

* * * * *